United States Patent [19]
Balaba et al.

[11] Patent Number: 5,492,730
[45] Date of Patent: Feb. 20, 1996

[54] SILOXANE COATING PROCESS FOR METAL OR CERAMIC SUBSTRATES

[75] Inventors: Willy M. Balaba, Monroeville; George H. Armstrong, New Kensington; Suzanne Kauffman, Apollo; Princewill N. Anyalebechi, Pittsburgh, all of Pa.

[73] Assignee: Aluminum Company of America, Pittsburgh, Pa.

[21] Appl. No.: 264,475

[22] Filed: Jun. 23, 1994

Related U.S. Application Data

[63] Continuation-in-part of Ser. No. 997,434, Dec. 28, 1992, Pat. No. 5,358,747.

[51] Int. Cl.$^6$ .............................. B05D 3/02; B05D 3/10
[52] U.S. Cl. ....................................... 427/387; 427/388.4
[58] Field of Search ................................ 427/387, 388.4

[56] References Cited

U.S. PATENT DOCUMENTS

| | | | |
|---|---|---|---|
| 3,412,062 | 11/1968 | Johnson et al. | 260/37 |
| 3,484,223 | 12/1969 | Vanderbilt et al. | 65/3 |
| 3,674,542 | 7/1972 | Vanderbilt et al. | 117/72 |
| 3,762,941 | 10/1973 | Hou | 117/93.1 |
| 3,855,174 | 12/1974 | Brie | 260/40 R |
| 3,983,272 | 9/1976 | Huber et al. | 543/850 |
| 4,056,651 | 11/1977 | Scola | 428/336 |
| 4,056,874 | 11/1977 | Kalnin | 75/0.5 |
| 4,270,840 | 6/1981 | Uchida et al. | 350/96.34 |
| 4,311,760 | 1/1982 | Kalinowski et al. | 428/391 |
| 4,316,930 | 2/1982 | Stengle, Jr. | 427/387 |
| 4,349,609 | 9/1982 | Takeda et al. | 428/429 |
| 4,376,804 | 3/1983 | Katzman | 428/408 |
| 4,431,982 | 2/1984 | Monroe et al. | 338/214 |
| 4,465,711 | 8/1984 | Senaha et al. | 427/379 |
| 4,861,901 | 8/1989 | Lau et al. | 549/215 |
| 4,895,766 | 1/1990 | Saad | 428/447 |
| 4,929,051 | 5/1990 | Rogler et al. | 350/96.3 |
| 4,961,990 | 10/1990 | Yamada et al. | 428/240 |
| 4,981,730 | 1/1991 | Clodgo et al. | 148/33.3 |
| 5,043,789 | 8/1991 | Linde et al. | 427/387 |
| 5,054,883 | 10/1991 | Eckberg | 385/145 |
| 5,057,341 | 10/1991 | Ogiso et al. | 427/387 |
| 5,120,811 | 6/1992 | Glotfelter et al. | 528/25 |
| 5,322,713 | 6/1994 | van Ooij et al. | 427/327 |
| 5,358,747 | 10/1994 | Balaba et al. | 427/387 |

FOREIGN PATENT DOCUMENTS

| | | | |
|---|---|---|---|
| 653350 | 12/1962 | Canada . | |
| 662670 | 5/1963 | Canada | 528/43 |
| 1092224 | 4/1989 | Japan | 528/43 |

OTHER PUBLICATIONS

Thermal and Oxidation Stability of Polymethyphenylsiloxanes, Murphy et al, Industrial and Engineering Chemistry, vol. 42, No. 12, pp. 2462–2468, Dec. 1950.

Abstract 05–310942 of Japanese Application 04–143338, Kimura et al, Feb. 1994.

Japanese Abstract 59–108033 of Japanese Application 57–215390, Hata et al., Oct. 1984.

Anderson, R., B. Arkles, G. L. Larson. *Silicon Compounds Register and Review*. Bistol PA.: Petrarch Systems, 1987.

Ismail, I. M. K. "Oxidation of carbon fibers and fabrics in air" University of Dayton Research Institute, Phillips Laboratory OLAC/RKFC, Edwards AFB, CA pp. 540–545 undated.

(List continued on next page.)

*Primary Examiner*—Diana Dudash
*Attorney, Agent, or Firm*—Douglas G. Glantz; David W. Brownlee

[57] ABSTRACT

A novel polymer-coated carbon, metal, or ceramic substrate is coated with an aromatic polysiloxane liquid coating solution polymerized to have non-linear, ladder silicon to oxygen bonding. A carbon, metal, or ceramic layer or substrate coated with the aromatic polysiloxane liquid polymer provides enhanced thermal protection and oxidative stability. The novel aromatic polysiloxane liquid polymer-coated carbon, metal, or ceramic substrate preferably includes a non-linear, ladder aromatic polysiloxane polymer-coated carbon, metal, or ceramic substrate such as provided by polyphenylsiloxane polymer having the general formula $R_nSiO_{(4-n)/2}$, wherein R comprises phenyl radical, and n has an average value of about 0.95 to 1.05.

9 Claims, 2 Drawing Sheets

OTHER PUBLICATIONS

Katzman, Howard A. "Fibre coatings for the fabrication of graphite–reinforced magnesium composites," *Journal of Material Science,* 1987, pp. 144–148.

Laurent, V., D. Chatain, N. Eustahopoulos. "Wettability of SiC by aluminum and Al–Si alloys," *Journal of Material Science,* 1987, pp. 244–250.

FIG. I

SILOXANE COATING PROCESS FOR METAL OR CERAMIC SUBSTRATES

This patent application is a continuation-in-part of prior, patent application U.S. Ser. No. 07/997,434 filed Dec. 28, 1992, now U.S. Pat. No. 5,358,747.

FIELD OF THE INVENTION

The present invention relates to siloxane coatings for the passivation of carbon, metal, or ceramic layers or substrates.

BACKGROUND OF THE INVENTION

Technological developments in material properties tailoring may require the use or application of a combination of two or more materials. In some instances, e.g., in the case of carbon/graphite-fiber-reinforced aluminum composites as "sandwiches," passivation of the layers or phases is necessary. This need for passivation of at least one of the layered materials is well known and widely reported.

Industrial high performance materials of the future are projected to make substantial utilization of aluminum and carbon-reinforced composites, and carbon fibers and fabrics theoretically have been described as providing desirable properties for high strength reinforcement. Among the desired properties are corrosion and high temperature resistance, low density, high tensile strength, and high modulus.

Reinforced components made from carbon graphite fibers have been observed to have limitations of undesirably low service ceiling temperatures, especially for applications using carbon graphite fibers exposed to the air or any oxidative environment. At temperatures as low as about 250° C., carbon fibers are known to undergo thermally induced transformations which lead to degradation in strength. Reinforced components made from carbon graphite fibers, including carbon fiber/carbon fabric reinforced composites, can only be used up to a service ceiling temperature of about 400° C. At temperatures approaching 400° C. and above, the carbon fiber or fabric oxidizes, and the mechanical properties in the carbon composite degrade.

Accordingly, the passivation of the carbon is critically important. In a related manner, it is also critically important to passivate aluminum, especially in the case of sandwiches, to passivate the aluminum metal component. Such passivation treatment of aluminum or aluminum alloy metal protects the metal against galvanic or atmospheric corrosion to prevent chemical and oxidative attack from aggressive environments, particularly at elevated temperatures.

Technical efforts have been made to develop a thermal protection to increase limited service ceiling temperatures and to eliminate the erosion in properties which begins at about 250° C. Currently, it is known to coat with inorganic coatings using chemical vapor deposition such as by $SiO_2$ vapor deposition, or by physical vapor deposition, as by nickel vapor deposition. However, the vapor deposition processes are found to be expensive, and further are found to be capable of application only to limited shapes and sizes of fibers, layers, or substrates to be coated. Moreover, these vapor deposition methods would be incapable of uniformly coating fabric material, particularly in areas of interwoven fiber cross-over. The vapor deposition techniques also are known to have residual porosity, which porosity would provide centers of attack by the oxidative agents.

Brown et al., Canadian Patent No. 662,670, disclose novel organopolysiloxanes. The Brown et al. siloxy units are linearly arranged using alkaline rearrangement catalyst for producing a white solid which then is dissolved in benzene. The polymer obtained is in the form of long white fibers. The solid is insoluble in methanol.

Brown et al. call for a precopolymer of either diphenylsiloxy or siloxy containing alkyl, alkenyl, or cyanoalkyl radicals to produce solid (intrinsic viscosity in benzene), high molecular weight organopolysiloxanes having aryl radicals, but which also can have, alkyl and alkenyl radicals.

Japanese patent application JO 1092-224-A by Mitsubishi Denki in its Abstract discloses phenylsilicone ladder polymer useful as interlayer insulation film of a semiconductor device.

In the search for high performance materials, considerable interest has been focused on carbon fibers and fabrics. The term "carbon" is used herein in its generic sense and includes graphite as well as amorphous carbon. Graphite fibers are defined herein as fibers which consist essentially of carbon and have a permanent x-ray diffraction pattern characteristic of graphite. Amorphous carbon fibers, on the other hand, are defined as fibers in which the bulk of the fiber weight can be attributed to carbon and which exhibit an essentially amorphous x-ray diffraction pattern. Graphite fibers generally have a higher Young's modulus than do amorphous carbon fibers and in addition are more electrically and thermally conductive. Carbon fabrics are sheet-like products formed from interwoven carbon fibers.

Aluminum sheet material is used in conventional reflector systems of electric lighting fixtures. Such specular sheet material typically has a total reflectance of about 87% or more. There still remains a need to improve the total reflectance of specular aluminum sheet material to increase efficiency of lighting fixtures and to reduce consumption of electricity.

Pankin, U.S. Pat. No. 4,562,517, discloses a method for improving the efficiency of lighting fixtures by providing reflectors coated with a very thin film of silver covered by a polymer. Such reflectors perform adequately for a while, but they are subject to delamination over long periods of time.

Ohno et al., U.S. Pat. No. 4,348,463, disclose a reflector of a metal substrate, a resin layer on the substrate, a light reflective metal over the resin layer, and a layer of ceramic over the metal layer. The Ohno et al. resin layer can include alkyl groups, and the number of functional groups in polymerizable groups is 2–3, i.e., X, Y, Z are 2–3.

It is an object of the present invention to produce a polymer-coated carbon, metal, or ceramic layer or substrate having enhanced thermal protection and oxidative stability.

It is a further object of the present invention to produce a polymer-coated carbon, metal, or ceramic layer or substrate, or a resultant carbon-reinforced composite produced therefrom, in an economical and efficient manner and method, including for the application of the polymer coating.

It is another object of the present invention to provide a carbon, metal, or ceramic layer or substrate coated efficiently by a polymer coating process scaled up for any shape or size of carbon, metal, or ceramic layer or substrate to be coated.

It is an object of the present invention to provide a method for synthesizing coatings which confer enhanced thermal protection and oxidative stability to carbon, aluminum, iron, steel, silicon dioxide, and other metal and ceramic layers or substrates.

It is another object of the present invention to provide a product and method for providing thermal protection and oxidative stability to carbon, metal, or ceramic layers and substrates without requiring high initial capital costs for producing the product or method.

It is a further object of the present invention to provide for coating carbon fibers or fabrics or to form a polymer-coated carbon or graphite fiber or fabric, or a resultant carbon-reinforced composite formed therefrom, having thermal protection and oxidative stability at temperatures higher than about 400° C.

It is an object of the present invention to provide a method for improving the total reflectance of aluminum sheet material.

A related objective of the invention is to provide a gel film coating for aluminum sheet material that will improve the reflectivity of a reflector layer overlying the gel film.

These and other objects of the present invention will become apparent from the detailed description which follows.

SUMMARY OF THE INVENTION

The present invention provides a polymer-coated carbon, metal, or ceramic layer or substrate and includes a specified aromatic polysiloxane liquid solution polymerized to have non-linear, ladder-polymer silicon to oxygen bonding and further includes coating a carbon, metal, or ceramic layer or substrate with the polysiloxane liquid polymer solution to form a polymer-coated carbon, metal, or ceramic layer or substrate, or a resultant reinforced composite formed therefrom, having enhanced thermal protection and oxidative stability at elevated temperatures.

Enhanced thermal protection and oxidative stability is defined as the ability to resist oxidation or to retain physical strength otherwise degraded by thermal exposure or oxidation at temperatures above about 250° C., more preferably at temperatures above about 400° C.

The specified aromatic polysiloxane liquid polymer of the present invention preferably includes a non-linear, ladder-polymer aromatic polysiloxane such as provided by polyphenylsiloxane having the general formula $R_nSiO_{(4-n)/2}$, wherein R comprises a phenyl radical, and n has an average value of about 0.95 to 1.05.

The polyphenylsiloxane liquid polymer preferably is formed by providing an aromatic silane monomer, acid hydrolyzing the aromatic silane to form a hydrolyzed aromatic silane, and condensing the hydrolyzed aromatic silane to form a non-linear, ladder-polymer cross-linked polyphenylsiloxane liquid solution.

The polyphenylsiloxane liquid polymer solution is applied to carbon, metal, or ceramic layers and substrates as a liquid and then is dried onto the carbon, metal, or ceramic layer or substrate at a temperature in the range of about 75° C.–110° C. to form a polysiloxane polymer-coated carbon having enhanced thermal protection and oxidative stability at elevated temperatures above about 400° C., e.g., such as in the range of about 400° C. to 600° C.

DETAILED DESCRIPTION

Figure 1:
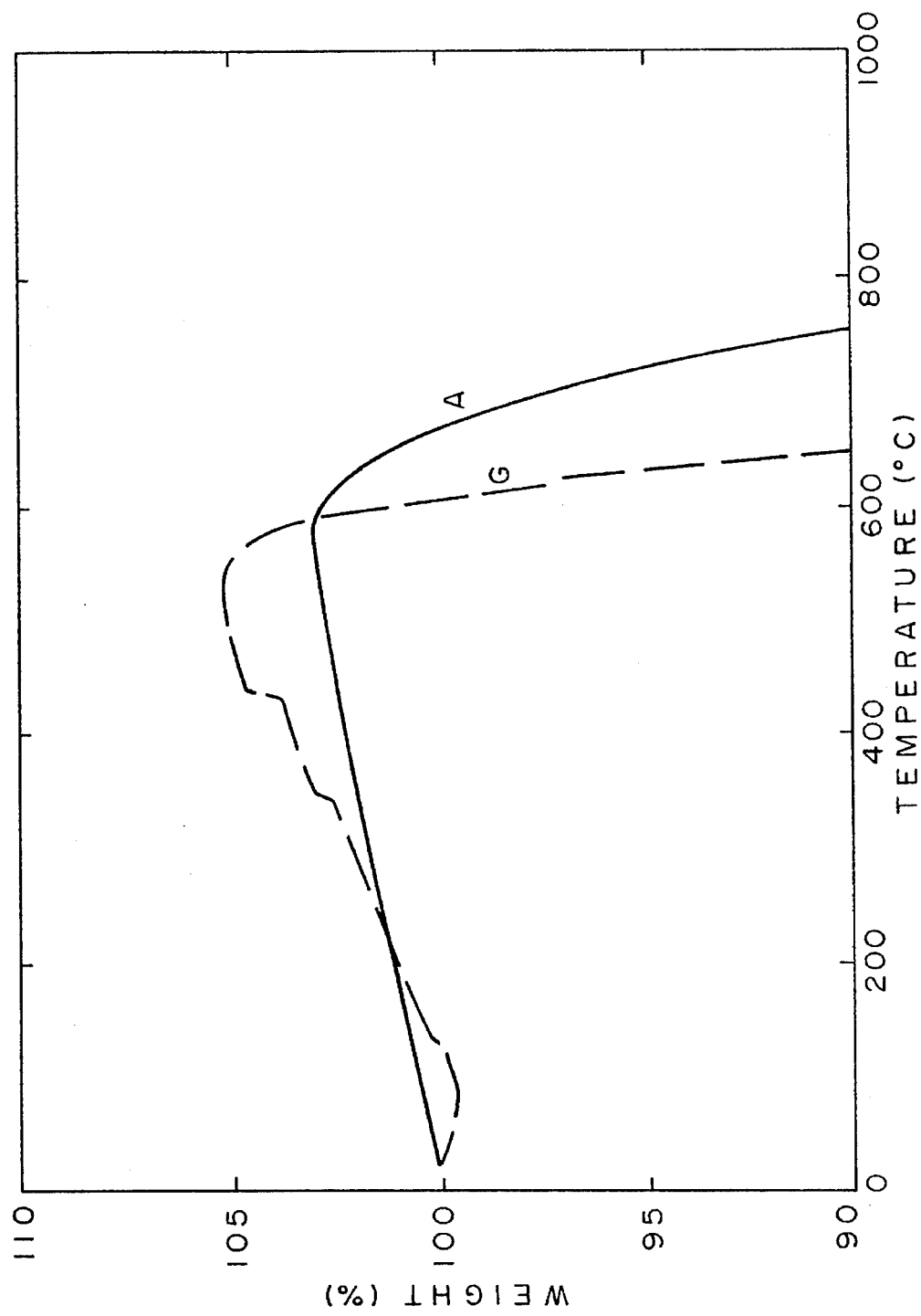
FIG. 1 is a graphical depiction comparing thermal protection and oxidative stability for uncoated fibers of the present invention using thermal gravimetric analysis.

The present invention includes applying a polymer coating of a polysiloxane liquid solution onto carbon, metal, or ceramic substrate, i.e., including aluminum, iron, steel, silicon dioxide, aluminum oxide, titania, zirconia, yttria, sialon, amorphous carbon or carbon graphite, fibers or fabrics, and drying to evaporate the carrier solvent. The liquid carrier solvent can be dried at a temperature above room temperature, e.g., such as at a temperature preferably in the range of about 75° C.–110° C. The carrier solvent preferably can be provided by various proportions of an alcohol/water mixture, such as, in one example, 95% by volume isopropanol/water mixture.

It has been found that the present invention requires a polymer coating of aromatic siloxane. Polysiloxanes other than aromatic siloxane polymers, i.e., such as alkyl, vinyl, or amine polysiloxanes, do not produce the desired thermal protection and oxidative stability provided by the aromatic polysiloxane required in the process and composition of the invention.

The specified aromatic siloxane polymer coating can be prepared by a starting material of aromatic silane which is then hydrolyzed and then chemically condensed to form a cross-linked aromatic siloxane liquid polymer. The resulting composition is used to produce a polymer-coated carbon, metal, or ceramic substrate fiber or fabric having superior thermal protection and oxidative stability. Superior thermal protection and oxidative stability is defined as the ability to resist oxidation and outgassing or to retain physical strength otherwise degraded by thermal exposure or oxidation, including at temperatures above about 250° C.

The present invention preferably includes a polyphenylsiloxane as the specified aromatic polysiloxane polymer. Preferably, the polyphenylsiloxane polymer comprises a compound having the general formula $R_nSiO_{(4-n)/2}$, wherein R comprises phenyl radical, and n has an average value of about 0.95 to 1.05.

Silicon-containing polymers represented as shown in the general formula $R_nSiO_{(4-n)/2}$ are found over the range of n=0–4. The significance of n is as it relates to silicon functionality (X). Three dimensional crosslinked polymers are obtained from monomers at least some of which possess a functionality exceeding two (2). Crosslinked polymers are defined, as such, as those containing units some of which are "polyfunctional," this term being reserved for functionalities exceeding two (2).

When n=0, this represents the case of silicon dioxide. Silicon dioxide (n=0, X=4) is not easily solubilized and is most often applied using vapor deposition methods.

The case of n=1 represents a silsesquioxane system, and these system are referred to herein as ladder-like or ladder polymer structures. The ladder polymer structures are two dimensional and are easily solubilized.

Another method of representing silicon chemistry is to use the functionality, X. When X=2 (n=0), there is linear chain formation, i.e., one dimensional linear growth.

Cases for which the functionality, X is greater than two (2) represent systems where cross-linking, i.e., three dimensional growth, takes place. Such systems where three dimensional growth takes place have a gel point. This gel point is the point where the solution viscosity becomes so large that reactants cannot diffuse to reaction sites and thereby suffer from incomplete reactions. Gelation also compromises shelf life and stability and renders them hard to solubilize. Correspondingly, incomplete reaction leads to problems of outgassing and elevated temperature.

The ladder structure of the polyphenylsiloxane polymer of the present invention, wherein it is required that n=about 0.95 to 1.05, represents a two dimensional structure and differentiates the preferred polyphenylsiloxane of the present invention from three dimensional cross-linked structures. Accordingly, the ladder structure specifies a particular definition of the non-linearity of the preferred heterocyclic polymeric siloxane coating composition of the present invention.

It has been found that polydiphenylsiloxane polymers (which have an n value higher than the specified n value of about 0.95 to 1.05) do not supply the thermal protection and oxidative stability provided by the polyphenylsiloxane polymer-coated carbon, metal, or ceramic substrate fibers, i.e., fibers coated with the polysiloxane of the formula $R_nSiO_{(4-n)/2}$, wherein R preferably comprises over 50% phenyl radical, and n has an average value of about 0.95 to 1.05.

Conventional methods for applying liquid to the carbon, metal, or ceramic substrate fiber or fabric may be used together with known techniques for drying the carrier solvent. In the case of applying the polymer liquid to carbon fabrics, an ultrasonic horn can be employed to assure complete coating of interwoven fiber crossover in the fabric.

The preferred polyphenylsiloxane polymer of the specified formula has been found to provide the desired thermal protection and oxidative stability produced and provided by the process and composition of the present invention.

The present invention produces a polymer-coated carbon, metal, or ceramic substrate fiber or fabric through the steps of providing a polyphenylsiloxane liquid polymer solution polymerized to have non-linear, ladder silicon to oxygen bonding, and coating the carbon, metal, or ceramic substrate fibers or fabric with the polyphenylsiloxane liquid polymer solution to form a polyphenylsiloxane polymer-coated carbon, metal, or ceramic layer or substrate having thermal protection and oxidative stability at elevated temperatures above about 400° C. The polymer-coated carbon product has been observed to provide resistance to oxidation of the carbon, to protect against degradation of physical properties, and to retain strength in coated graphite fibers at temperatures in the range of from about 400° C. to as high as about 700° C. and higher.

The polyphenylsiloxane polymer of the present invention preferably provides an aromatic polysiloxane polymer with a liquid solution containing at least about 50% polyphenylsiloxane and, more preferably, at least about 80% polyphenylsiloxane.

The specified polyphenylsiloxane polymer can be provided by a starting material supplied by an aromatic silane monomer having one phenyl moiety. Preferably, the phenyl moiety is pendant on the silicon. The preferred starting material monomer is phenyltrimethoxysilane as depicted in the following chemical formula.

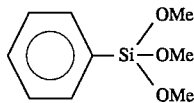

The aromatic silane monomer is hydrolyzed, e.g., by acid hydrolyzing, to form a hydrolyzed aromatic silane which then is condensed to form a cross-linked aromatic polysiloxane. The aromatic polysiloxane polymer preferably has a cross-linked structure to provide non-linear silicon to oxygen bonding, more preferably non-linear, ladder silicon to oxygen bonding wherein the phenyl moiety is pendant on the silicon.

It has been found that the aromatic polysiloxane polymer preferably contains a compound having the general formula:

$$R_nSiO_{(4-n)/2}$$

wherein

R comprises over 50% phenyl radical, and n has an average value of about 0.95 to 1.05.

More preferably, R contains over 80% phenyl radical with n having an average value of about 0.95 to 1.05.

The specified polyphenylsiloxane liquid polymer for coating carbon, metal, or ceramic substrate in providing the essential elements of the present invention has a ladder cross-linked structure which can be depicted in the following molecular structure.

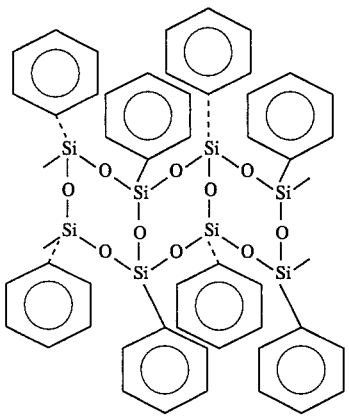

The ladder structure of the polyphenylsiloxane polymer of the present invention represents a two dimensional cross-linked structure and differentiates the preferred polyphenylsiloxane of the present invention from three dimensional cross-linked structures. Accordingly, the ladder structure specifies a particular definition of the non-linearity of the preferred heterocyclic polymeric siloxane coating composition of the present invention.

It has been found that polydiphenylsiloxane polymers (which have an n value higher than the specified n value of about 0.95 to 1.05) do not supply the thermal protection and oxidative stability provided by the polyphenylsiloxane polymer-coated carbon, metal, or ceramic substrate fibers, i.e., fibers coated with the polysiloxane of the formula $R_nSiO_{(4-n)/2}$, wherein R preferably comprises over 50% phenyl radical, and n has an average value of about 0.95 to 1.05.

The polyphenylsiloxane liquid polymer solution is applied to the carbon, metal, or ceramic substrate fiber or fabric by coating the carbon, metal, or ceramic substrate fiber or fabric with the liquid solution and then drying the carrier solvent, thereby to deposit the liquid polysiloxane polymer onto the carbon, metal, or ceramic substrate fiber or fabric. The drying step should take place at a temperature above room temperature, e.g., at a temperature in the range of about 75° C.–110° C., more preferably in the range of about 90° C.–105° C.

Prior to coating with the phenylsiloxane liquid solution, the carbon, metal, or ceramic substrate fiber filaments or fabrics preferably are cleaned with one or more polar solvents or pyrolyzed in an inert atmosphere at about 400° C. to drive off any organic sizing. The cleaned carbon, metal, or ceramic substrate fiber filaments or fabrics then can be coated with polysiloxane polymer solution which will adhere directly to the carbon, metal, or ceramic substrate.

The polyphenylsiloxane ladder-polymer-coated carbon, metal, or ceramic substrate fibers or fabrics are particularly suited for industrial application as polymer-coated carbon-reinforced carbon/carbon or carbon/aluminum matrix or matrices.

In accordance with the invention, there is also provided coated metal sheet material having improved reflectivity. The material preferably comprises a base layer of aluminum or an aluminum alloy, a gel film overlying the base layer and a reflector layer overlying the gel film. Surprisingly, we have found that reflectivity can be improved by applying a gel film to reduce surface roughness.

The aluminum sheet material is generally produced from aluminum, e.g. 99% purity or higher, or from an alloy of aluminum and manganese or an alloy of aluminum and magnesium. For example, AA1000, AA3000, or AA5000 aluminum can be used. The sheet material ordinarily has a thickness of about 500–800 microns. Prior to treatment in accordance with the present invention, the sheet has average surface roughness of greater than about 20 nm and usually about 40–50 nm.

Surface roughness of the sheet material is reduced by application of a gel film comprising polysiloxane in accordance with the present invention.

The sol film may be applied to the sheet material as a siloxane polymer solution. A suitable siloxane polymer is polyphenylsilsesquioxane in accordance with the present invention. Evaporation of the solvent from the solution leaves a gel film.

The gel-coated sheet material is rendered reflective by successively applying coatings of silica, metal, silica, and titania. The first silica layer may have a thickness of about 200–2000 Å and is about 500 Å thick in one preferred embodiment. The metal layer is preferably aluminum. The aluminum layer has a total thickness of about 500–2000 Å and is about 1000 Å thick in a preferred embodiment. A second silica layer is applied over the aluminum layer to a total thickness of about 500–2000 Å, preferably about 700 Å. Finally, titania is applied over the silica to a thickness of about 200–2000 Å, preferably about 450 Å. The gel film and reflector layer together have a total thickness of approximately 3150–7650 Å.

The silica, metal, silica, and titania layers are all applied by sputtering in the particularly preferred embodiment described herein. Alternatively, these layers may be applied by evaporation, chemical vapor deposition, or other preferred coating techniques.

Example I

A reagent grade isopropanol/water mixture having 95% by volume isopropanol content was adjusted to a pH of about 4.5 using reagent grade acetic acid. Phenyltrimethoxysilane monomer obtained commercially from Huls of America, Bristol, Pa., was added to the isopropanol/water mixture and dissolved to give a 20% by weight solution. The liquid solution thus obtained was refluxed at about 80° C. for about five (5) hours, followed by cooling to room temperature to produce an oligomerized polyphenylsiloxane solution identified as Coating A.

Graphite fiber tows from Hercules, Wilmington, Del. under the trade name Hercules AS4-12+K were cleaned ultrasonically with trichloroethane, acetone, and methanol, each stage taking ten (10) minutes, and subsequently oven dried at about 100° C. for two (2) hours. The cleaned fibers then were coated in an ultrasonic bath with the polyphenylsiloxane Coating A. The Coating A was formed into a glassy coating by heating using a ramp rate of about 20° C. per hour to 200° C. with a soak period at peak temperature for about one (1) hour at atmospheric pressure.

Example II

Polydimethoxysiloxane and polymethylsilsesquioxane obtained commercially from Huls of America, Bristol, Pa., were dissolved separately in isopropanol to form liquid Coating B and Coating C, respectively.

Fiber tows obtained from Corning Glass Company of Corning, N.Y. composed of unsized E-2 glass fiber suitable for providing a substrate for testing the thermal protection of polymer coatings were cleaned ultrasonically with trichloroethane, acetone, and methanol, each stage taking ten (10) minutes, and subsequently were oven dried at about 330° C. for two (2) hours.

The cleaned fibers then were coated in an ultrasonic bath with the polydimethoxysiloxane Coating B and polymethylsilsesquioxane Coating C. The Coatings B and C were formed into a glassy coating by heating at a ramp rate of about 20° C. per hour to 200° C. and a soak period at peak temperature for about one (1) hour at atmospheric pressure.

Example III

A reagent grade isopropanol/water mixture having a 95% by volume isopropanol content was adjusted to a pH of about 4.5 using reagent grade acetic acid. Diphenyldimethoxysilane monomer obtained commercially from Huls of America, Bristol, Pa., was added to the isopropanol/water mixture and dissolved to give 20% by weight solution. The liquid solution thus obtained was refluxed at about 80° C. for about five (5) hours, followed by cooling to room temperature to produce an oligomerized polydiphenylsiloxane solution Coating D.

Graphite fiber tows obtained from Hercules, Wilmington, Del. under the trade name Hercules AS4-12+K were cleaned ultrasonically with trichloroethane, acetone, and methanol, each stage taking ten (10) minutes, and subsequently oven dried at about 100° C. for two (2) hours. The cleaned fibers then were coated in an ultrasonic bath with the polydiphenylsiloxane Coating D. The Coating D was formed into a glassy coating by heating at a ramp rate of about 20° K. per hour to 200° C. and a soak period at peak temperature for about one (1) hour at atmospheric pressure.

Example IV

The polymer-coated graphite fibers formed in the Examples I, II, and III and uncoated carbon graphite (G) fibers were subjected to thermal gravimetric analysis (TGA) according to the following procedure. With air flowing above the sample, the thermal gravimetric analyzer (TGA) furnace temperature was raised at a constant heating rate until the entire carbon gasified. The change in sample weight was monitored as a function of temperature and time. Sample weight and temperature were monitored every fifteen seconds. The constant heating rate was at 20° C. per minute.

Figure 2:
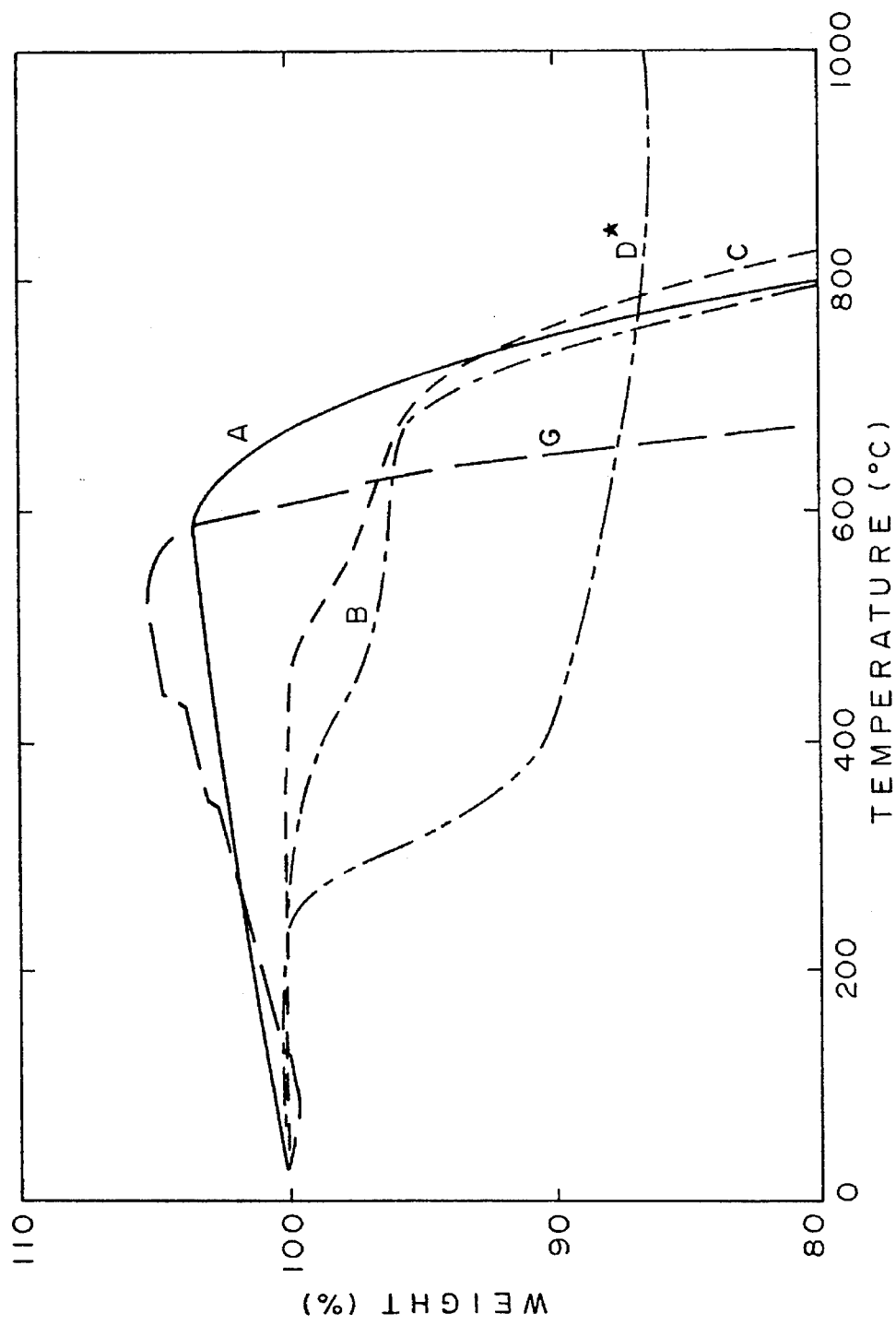
FIG. 2 is a graphical depiction comparing thermal protection and oxidative stability for uncoated fibers and various polysiloxane polymer-coated fibers using thermal gravimetric analysis.

The results of the thermal gravimetric analysis are shown in FIG. 1 for Coating A and uncoated carbon graphite G and FIG. 2 for Coatings A, B, C, and D and uncoated carbon graphite G.

The cleaned and coated carbon fibers coated with the Coating A polyphenylsiloxane polymer formed in Example I exhibited significantly enhanced thermal protection and oxidative stability. The uncoated carbon fibers G were observed to oxidize beginning at temperatures approaching 400° C. as shown by the increase in weight above 100%. The increase in weight was due to oxidized carbon. The oxidized carbon was observed to degrade the strength of the fibers.

The cleaned and coated carbon fibers coated with polymethylsiloxanes B, polymethylsilsesquioxane C, and polydiphenylsiloxane D showed thermal degradation as depicted graphically in FIG. 2 by decreased weight below 100%, but the service ceiling temperature for the carbon graphite fibers coated with the Coating A polyphenylsiloxane non-linear, ladder polymer was extended, as shown by an essentially flat graphical plot of weight, to a service ceiling temperature including from 400° C. to above about 600° C.

Example V

A sheet of aluminum 5657 alloy (AA series) had an initial surface roughness of about 40–50 nm. A 20 wt. % solution of phenyltrimethoxysilane dissolved in 95% isopropanol and 5% water was acidified with glacial acetic acid to produce a pH of about 4.5. The acidified solution was heated for 5 hours at 80° C. to form a solution containing siloxane oligomers. The solution was then coated onto the aluminum sheet to form a thin solution film. The sheet material was then heated to a temperature of about 105° C. Average surface roughness of the aluminum alloy sheet covered with the film was reduced to less than about 20 nm.

A reflective coating stack was applied over the film by successively sputtering layers of silica, aluminum, silica, and titania. The first silica layer had a thickness of about 500 Å, and it improved adhesion of the aluminum layer to the film. The aluminum layer was about 1000 Å thick. The second silica layer applied over the aluminum was transparent, with a thickness of about 70 Å. The titania layer applied over the second silica layer was transparent with a thickness of about 450 Å. The titania layer had a higher index of refraction than the second silica layer.

Before treatment as described above, the sheet had distinctness of image (D/I) value of about 95% and total reflectance of about 30%. Total reflectance readings were obtained using an integrating sphere reflectometer such as a Diano Corp. TR-1 or Technidyne TR-2 in accordance with ASTM D-78. Distinctness of image values was measured on a Dori-Gon gloss meter in accordance with ASTM E430 wherein a beam of light was directed onto the sheet surface at an incident angle of 30°, and the relative amount of light reflected at 10 minutes from the specular angle is used to calculate a D/I value.

Aluminum alloy sheet material coated in accordance with the procedure described above had an improved D/I value of about 97%. Total reflectance was also increased to about 96%.

The AA5657 aluminum alloy sheet coated in accordance with the present invention had a thickness of about 25 mils (635 microns). Before coating with the siloxane layer, the sheet had average surface roughness of about 40–50 nm. The coating had a total thickness of approximately 1000 Å (100 nm). The reflector layer included a first silica layer having a thickness of approximately 500 Å; an aluminum layer having a thickness of approximately 1000 Å; a second silica layer having a thickness of approximately 700 Å; and a titania layer having a thickness of approximately 450 Å. Total thickness of the reflector layer was about 2650 Å. All four layers were applied by sputtering.

The present invention provides a product and a process for making that product which solve and overcome problems and limitations of undesirably low service ceiling temperatures, especially for applications exposed to the air or any oxidative or corrosive environment. At temperatures as low as about 250° C., thermally induced transformations lead to degradation in strength. Reinforced components made from carbon graphite fibers, for example, including carbon fiber/carbon fabric reinforced composites, can only be used up to a service ceiling temperature of about 400° C.

At temperatures approaching 400° C. and above, the carbon, metal, or ceramic layer or substrate oxidizes, and the mechanical properties in the carbon composite degrade.

The present invention provides for coating carbon, metal, or ceramic layers and substrates or to form a polymer-coated carbon, metal, or ceramic layer and substrate having thermal protection and oxidative stability at temperatures higher than about 400° C.

The polyphenylsiloxane liquid polymer solution is applied to carbon, metal, or ceramic layer and substrate as a liquid and then is dried onto the carbon, metal, or ceramic layer or substrate at a temperature in the range of about 75° C.–110° C. to form a polysiloxane polymer-coated layer or substrate having enhanced thermal protection and oxidative stability at elevated temperatures above about 400° C., e.g., such as in the range of about 400° C. to 600° C.

Prior technical efforts have been made to develop a thermal protection to increase a limited service ceiling temperature and to eliminate the erosion in properties which begins at about 250° C. Chemical vapor deposition such as by $SiO_2$ vapor deposition, or by physical vapor deposition, as by nickel vapor deposition are too expensive, and can be applied only to limited shapes and sizes of the fibers or substrates to be coated. These vapor deposition methods are incapable of uniformly coating fabric material, particularly in areas of interwoven fiber cross-over. The vapor deposition techniques have residual porosity, which porosity would provide centers of attack by the oxidative agents.

The novel process and product of the present invention provide thermal and oxidative protection to produce a polymer-coated carbon, metal, or ceramic layer or substrate having enhanced thermal protection and oxidative stability. The present invention produces a polymer-coated carbon, metal, or ceramic layer or substrate in an economical and efficient manner and method, including for the application of the polymer coating. The present invention provides a carbon, metal, or ceramic layer or substrate coated efficiently by a polymer coating process scaled up for any shape or size of carbon, metal, or ceramic layer or substrate to be coated. The present invention provides a product and method providing thermal protection and oxidative stability without requiring high initial capital costs for producing the product or method.

The present invention includes a polyphenylsiloxane as the specified aromatic polysiloxane polymer. The polyphenylsiloxane polymer comprises a compound having the general formula $R_nSiO_{(4-n)/2}$, wherein R comprises phenyl radical, and n has an average value of about 0.95 to 1.05. The polyphenylsiloxane polymer of the specified formula has been found to provide the desired thermal protection and oxidative stability when processed and produced in combination with the process and composition of the present invention. The resulting polymer-coated carbon product of the present invention as been observed to provide superior passivation and resistance to oxidation, to protect against degradation of physical properties, and to retain strength in coated layers or substrates at elevated temperatures in the range of from about 400° C. to as high as about 700° C. and higher.

It has been found empirically that cleaned and coated fibers coated with the Coating A polyphenylsiloxane polymer formed in accordance with the present invention as described in Example I exhibited significantly enhanced thermal protection and oxidative stability. Cleaned and coated fibers coated with polydimethylsiloxane B, polymethylsilsesquioxane C, and polydiphenylsiloxane D showed thermal degradation as depicted graphically in FIG. 2 by decreased weight below 100%, but the service ceiling temperature for the fibers coated with the Coating A polyphenylsiloxane non-linear, ladder polymer of the present invention was extended, as shown by an essentially flat graphical plot of weight, to a service ceiling temperature including from 400° C. to above about 600° C.

It has been found that the present invention requires a polymer coating of aromatic siloxane. Polysiloxanes other than aromatic siloxane polymers, i.e., such as alkyl, vinyl, or amine polysiloxanes, do not produce the desired thermal protection and oxidative stability provided by the aromatic polysiloxane required in the process and composition of the present invention.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

What is claimed is:

1. A method for producing a polymer-coated metal or ceramic substrate comprising:
   a. providing an aromatic silane monomer in a mixture of an alcohol and water;
   b. acid hydrolyzing said aromatic silane monomer to form a hydrolyzed aromatic silane;
   c. condensing said hydrolyzed aromatic silane to form an aromatic polysiloxane liquid solution consisting of aromatic polysiloxane in said alcohol and water mixture polymerized to have non-linear, ladder-polymer bonding; and
   d. coating a metal or ceramic substrate with said aromatic polysiloxane liquid solution to form a polysiloxane polymer-coated metal or ceramic substrate.

2. The method as set forth in claim 1, said aromatic polysiloxane consisting of polyphenylsiloxane wherein the phenyl moiety is pendant on the silicon.

3. The method as set forth in claim 2 wherein said aromatic silane monomer comprises a silane monomer having one phenyl moiety.

4. The method as set forth in claim 2 wherein said aromatic polysiloxane polymer consists of a compound having the general formula $R_nSiO_{(4-n)/2}$, wherein
   R comprises a mono-pendant phenyl radical, and
   n has an average value of about 0.95 to 1.05.

5. The method as set forth in claim 2 wherein said polysiloxane consists of essentially of a compound having the general formula $R_nSiO_{(4-n)/2}$, wherein
   R consists essentially of phenyl radical, and
   n has an average value of about 0.95 to 1.05.

6. The method as set forth in claim 5 wherein said polysiloxane contains the general formula $R_nSiO_{(4-n)/2}$, wherein R consists of phenyl radical.

7. The method as set forth in claim 6 wherein said coating step further comprises drying said liquid polysiloxane solution on said metal or ceramic substrate.

8. The method as set forth in claim 7 wherein said coating step comprises drying said polysiloxane solution onto said metal or ceramic substrate at a temperature in the range of about 75°–110° C.

9. A method for producing a polymer-coated metal or ceramic substrate, comprising:
   (a) providing a polysiloxane liquid solution having non-linear silicon to oxygen bonding characterized by the general formula of $R_nSiO_{(4-n)/2}$, wherein R is a phenyl radical and n has an average value of about 0.95 to 1.05, said polysiloxane being formed by acid hydrolyzing a mono-phenyl silane monomer and condensing to form a cross-linked polyphenylsiloxane polymer having ladder-polymer heterocyclic bonding,
   (b) applying said cross-linked ladder-polymer heterocyclic polyphenylsiloxane as a liquid solution in an alcohol and water mixture to a metal or ceramic substrate, and
   (c) drying said liquid cross-linked, ladder-polymer, heterocyclic polyphenylsiloxane onto said metal or ceramic substrate at a temperature of about 75° C.–110° C. to forth a polysiloxane polymer-coated metal or ceramic substrate being substantially infusible above about 400° C. to about 600° C.

* * * * *